INVENTORS
ARY VAN DER LELY
CORNELIS JOHANNES GERARDUS BOM
BY
Mason, Mason & Albright
Attorneys

United States Patent Office 3,411,672
Patented Nov. 19, 1968

3,411,672
DEVICES FOR SPREADING LIQUID SUBSTANCES SUCH AS MANURE
Ary van der Lely, 10 Weverskade, Maasland, Netherlands, and Cornelis J. G. Bom, 36 Esdoornlaan, Rozenburg, Netherlands
Filed Jan. 13, 1967, Ser. No. 609,219
Claims priority, application Netherlands, Feb. 7, 1966, 6601507
13 Claims. (Cl. 222—136)

ABSTRACT OF THE DISCLOSURE

This device is a liquid fertilizer spreader in which a suction-pressure pump evacuates or pressurizes the supply vessel to draw in or force out the liquid. A float in the vessel automatically discontinues suction by opening the suction duct to the atmosphere when a predetermined level in the vessel is reached.

---

This invention relates to devices for spreading liquid substances such as manure.

According to one aspect of the present invention there is provided a device for spreading liquid substances, such as manure, comprising a ground-wheel supported frame having a pressure vessel and a suction-pressure pump communicating with said vessel mounted thereon, the pump serving for evacuating the vessel to draw liquid substances into the vessel, and for pressurizing the vessel to empty the vessel of liquid substances, the device having means serving, when the vessel is being filled, to cause the pump to communicate automatically with the ambient air when a predetermined volume of liquid has been drawn into the vessel so that the pump ceases to evacuate the vessel.

According to another aspect of the present invention there is provided a device for spreading liquid substances, such as manure, comprising a ground-wheel supported frame having a pressure vessel and a suction-pressure pump communicating with said vessel mounted thereon, wherein there is provided a structure for introducing small quantities of an oil-like liquid into the vessel.

For a better understanding of the invention and to show how the same may be readily carried into effect, reference will now be made, by way of example, to the accompanying drawings, in which.

Figure 1:
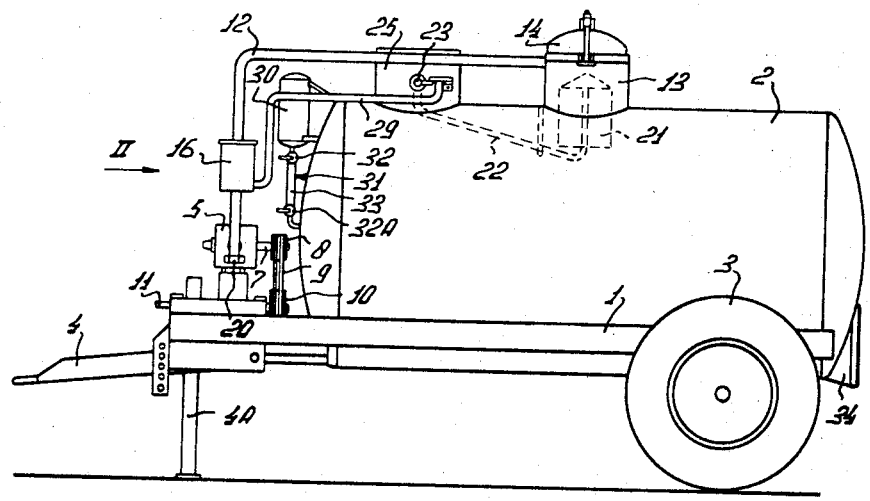
FIGURE 1 is a side view of a device for spreading liquid manure.

The device for spreading liquid manure shown in the figures has a frame 1 supporting a pressure vessel 2. At the rear the frame 1 is supported from ground wheels 3 and at the front there is provided a drawbar 4 which can be attached to a vehicle for moving the device. The front of the frame 1 is furthermore provided with a supporting foot 4A for supporting the device at the front when it is not attached to a vehicle. The foot 4A is adjustable in the direction of height and fixable in a plurality of positions, in a manner not shown, the normal operative position of the device being that wherein the frame 1 is substantially horizontal.

In front of the pressure vessel 2 a suction-pressure pump 5 is mounted on the frame 1, which pump can be driven by a power take-off shaft of the vehicle moving the device during operation. To this end the rotary shaft 7 of the pump is provided with a multiple pulley 8 which is linked through ropes 9 to a multiple pulley 10 mounted on a shaft 11 which can be coupled through an intermediate shaft with the power take-off shaft just referred to.

The suction-pressure pump 5 is connected through a duct 15', a two-way cock 17 and a duct 12 with a chamber 13 carried by the upper part of the vessel 2. The chamber 13 has a lid 14 which can be screwed shut.

Figure 2:
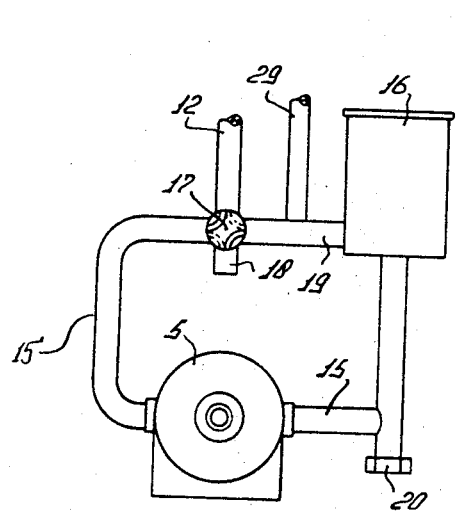
FIGURE 2 is a front view, taken in the direction of the arrow II of FIGURE 1 and drawn to a larger scale, of part of the device of FIGURE 1.

From FIGURE 2 it will be seen that the suction-pressure pump 5 is also connected through a duct 15 with a filter 16. The two-way cock 17 can be set, as desired, either to establish a communication between the duct 12 and the duct 15 and between an inlet-outlet 18 and a duct 19 connected to the filter 16 (as shown in full lines in FIGURE 2), or to establish a communication between the duct 12 and the duct 19 and between the duct 15' and the inlet-outlet 18 (as shown in dotted lines in FIGURE 2).

A branched-off part of the duct 15 is provided with a tap 20.

Figure 3:
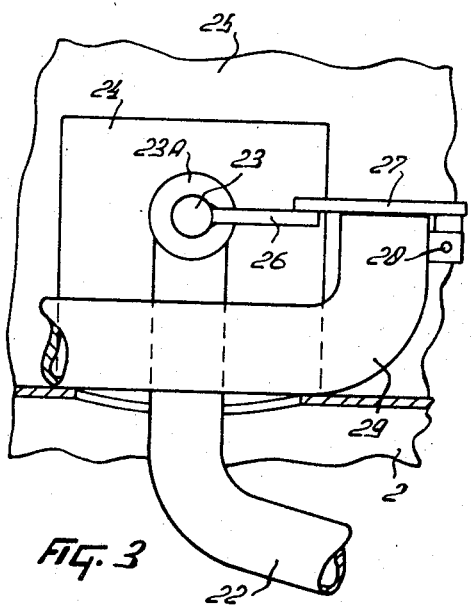
FIGURE 3 is a side view, drawn to a still larger scale and partly broken away, of part of the device of FIGURES 1 and 2.

In the chamber 13 there is mounted a float 21 which is secured to an arm 22 the other end (FIGURE 3) of which is fast with a shaft 23 supported by a support 24 so as to be substantially horizontal when the frame 1 is substantially horizontal. The shaft 23 is journalled in bearings 23A in the walls of a cylindrical chamber 25 and an end portion of the shaft 23 which projects from the chamber 25 carries, outside the chamber 25, an actuating finger 26. This finger 26 co-operates with a flap 27 pivotally supported by a shaft 28 carried by the end portion of a duct 29 that communicates with the duct 19 outside the filter 16. The shaft 28 extends parallel to the pivotal shaft 23 of the float arm 22 and the flap 27 normally closes the open end of the duct 29.

In front of the vessel 2 there is provided a reservoir 30 which communicates with the vessel 2 through a duct 31. From FIGURE 1 it will be seen that the duct 31 includes two spaced-apart closing members 32 and 32A. One closing member 32 is located directly beneath the reservoir 30, whereas the other closing member 32A is located near the mouth of the duct 31 in the vessel 2. Between the closing membetrs 32 and 32A there is a gauge glass 33 which is provided with a scale. In operation the reservoir 30 contains an oil-like liquid.

The device described above operates as follows. In order to fill the pressure vessel 2 a hose (not shown) of large diameter is connected to an inlet-outlet 34 at the rear of the vessel and introduced into the liquid substance, for example, manure or slush, to be drawn-in. The two-way cock 17 is set (dotted lines in FIGURE 2) to establish communication between the duct 19 and the duct 12, and between the duct 15' and the inlet-outlet 18 and the pump is started up to evacuate the vessel 2, air being drawn from the vessel 2 through the duct 12, the duct 19, the filter 16 and the duct 15 to pass through the pump 5 and duct 15' to the inlet-outlet 18. At this stage the duct 29 is closed by the flap 27. As the air is drawn out of the vessel 2, the liquid substance is drawn in through the hose and the inlet-outlet 34. When the vessel is almost full the float 21 is caused to rise to an extent such that the finger 26 on the arm 22 lifts the flap 27 which has been closing the end of the duct 29. Thus when a predetermined volume of liquid has been drawn into the vessel the duct 29 is opened to the ambient air and therefore the pump 5 is automatically connected to the ambient air through the duct 29, the duct 19, the filter 16 and the duct 15 so that the pump ceases to evacuate the vessel and air is no longer drawn out of the vessel 2 through the duct 12. It is thus avoided that the vessel becomes filled to an extent such that the liquid substance might get into the duct 12 and the pump 5.

After the vessel 2 is filled the device is moved to the place where the liquid substance has to be spread. During spreading the pump is utilized to supply air under pressure to the vessel 2, as the device is towed over the ground, the cock 17 being set to the full line position of FIGURE 2 to establish communication between the inlet-outlet 18, the duct 19, the filter 16 and the duct 15, and between the ducts 15' and 12. The liquid substance contained in the vessel 2 can thus be forced away, as the vessel is pressurized by the pump, through a distributor (not shown) provided at the inlet-outlet 34.

Certain liquid substances, especially those containing manure of poultry, tend to produce large quantities of foam, when introduced into or conducted away from the vessel 2, which is not desirable. This foaming effect can be suppressed by adding oil-like liquid from the reservoir 30. For this purpose a given quantity of liquid can be allowed into the gauge glass by opening the member 32 and thereafter the member 32A is opened so that this quantity of liquid, which is indicated on the gauge glass, is drawn into the vessel 2. By means of this structure the troublesome foaming phenomenon in the vessel can be suppressed.

What we claim is:

1. A device for spreading liquid substances, such as manure, comprising a ground-wheel supported frame mounting a pressure vessel, a suction-pressure pump communicating with said vessel, means for placing said pump in communication with the interior of said vessel to evacuate same whereby liquid substances can be drawn into said vessel and for pressurizing said vessel to empty same of liquid substances, safety means associated with said pump to automatically place same in communication with the ambient air when a predetermined volume of liquid substance has been drawn into the vessel whereby said pump ceases to evacuate the vessel, said safety means including a float positioned inside said vessel, said float being carried by an arm pivotally supported in said device and said arm being associated with an actuating member mounted on said device outside said vessel, said actuating member cooperating with a closing member to establish communication between said pump and ambient air.

2. A device as claimed in claim 1, wherein said actuating member is a finger arranged to be actuated by said arm to open said closing member.

3. A device as claimed in claim 2, wherein said arm is pivotally supported by a shaft that extends in a substantially horizontal direction during normal operation of the device.

4. A device as claimed in claim 3, wherein the pivotal shaft is located in a chamber in communication with said vessel, said finger being carried by a portion of said pivotal shaft that projects from said chamber.

5. A device as claimed in claim 4, wherein said closing member is adapted to turn about a second shaft which extends substantially parallel to said pivotal shaft of said float arm.

6. A device as claimed in claim 1, wherein said closing member is arranged to form a closure for one end of a duct which communicates with said pump when said vessel is being evacuated.

7. A device as claimed in claim 1, wherein a reservoir for introducing small quantities of an oil-like liquid into said vessel is supported adjacent said vessel.

8. A device for spreading liquid substances, such as manure, comprising a ground-wheel supported frame mounting a pressure vessel, a suction-pressure pump communicating with said vessel, a reservoir for introducing small quantities of an oil-like liquid into said vessel being supported adjacent said vessel and in communication therewith whereby said oil-like liquid can be dispensed in said vessel.

9. A device as claimed in claim 8, wherein said reservoir communicates with said vessel through a duct having at least one closing member.

10. A device as claimed in claim 9, wherein said duct includes two spaced-apart closing members.

11. A device as claimed in claim 10, wherein one of said closing members is located near said reservoir and the other member is located near an inlet of said vessel.

12. A device as claimed in claim 10, wherein a gauge glass is disposed between the two closing members.

13. A device for spreading liquid substances, such as manure, comprising a ground-wheel supported frame mounting a pressure vessel, a suction-pressure pump mounted on one end of said device and in communication with said pressure vessel, safety means associated with said pump to automatically place said pump in communication with the ambient air when the level of substances in said vessel reaches a predetermined level, said safety means including a float positioned inside said vessel, said float being carried by an arm pivotally supported in said device, said arm being associated with an actuating member outside said vessel, said arm cooperating with a closing member that establishes communication between said pump and ambient air, said device having an inlet-outlet at its end opposite from said pump, a duct system including a two-way cock member for permitting said vessel to be evacuated and pressurized.

References Cited

UNITED STATES PATENTS

| 2,533,395 | 12/1950 | Paine | 141—26 |
| 3,040,785 | 6/1962 | Grindle | 222—176 X |
| 681,320 | 8/1901 | Hood | 222—155 |

FOREIGN PATENTS

| 587,449 | 11/1959 | Canada. |
| 722,617 | 1/1955 | Great Britain. |
| 744,780 | 2/1956 | Great Britain. |

ROBERT B. REEVES, *Primary Examiner.*

HADD S. LANE, *Assistant Examiner.*